(12) United States Patent
Gregerson

(10) Patent No.: US 8,479,995 B2
(45) Date of Patent: Jul. 9, 2013

(54) HYBRID OPTICAL CODE SCANNER AND SYSTEM

(75) Inventor: David Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/248,831

(22) Filed: Sep. 29, 2011

(65) Prior Publication Data
US 2013/0082110 A1 Apr. 4, 2013

(51) Int. Cl.
*G02B 26/00* (2006.01)
(52) U.S. Cl.
USPC ............. 235/462.37; 235/462.38; 235/462.39
(58) Field of Classification Search
USPC ........................... 235/462.37, 462.38, 462.39
See application file for complete search history.

(56) References Cited

U.S. PATENT DOCUMENTS

| | | | | |
|---|---|---|---|---|
| 6,003,773 A | * | 12/1999 | Durbin et al. | 235/462.45 |
| 7,712,667 B2 | * | 5/2010 | Laser | 235/468 |
| 7,780,087 B2 | * | 8/2010 | Bobba et al. | 235/462.39 |
| 2006/0196948 A1 | * | 9/2006 | Weber et al. | 235/487 |
| 2009/0084855 A1 | * | 4/2009 | Herwig | 235/462.41 |
| 2009/0152348 A1 | * | 6/2009 | Ostrowski et al. | 235/383 |

* cited by examiner

*Primary Examiner* — Ahshik Kim
(74) *Attorney, Agent, or Firm* — Paul W. Martin; Harden E. Stevens, III

(57) ABSTRACT

A hybrid optical code scanner and system are presented for improving an operators scanning performance. The scanning performance is improved by providing a visual indicator to the operator that identifies the optimal location for presenting an optical code to an imaging scanner in the hybrid optical code scanner.

14 Claims, 3 Drawing Sheets

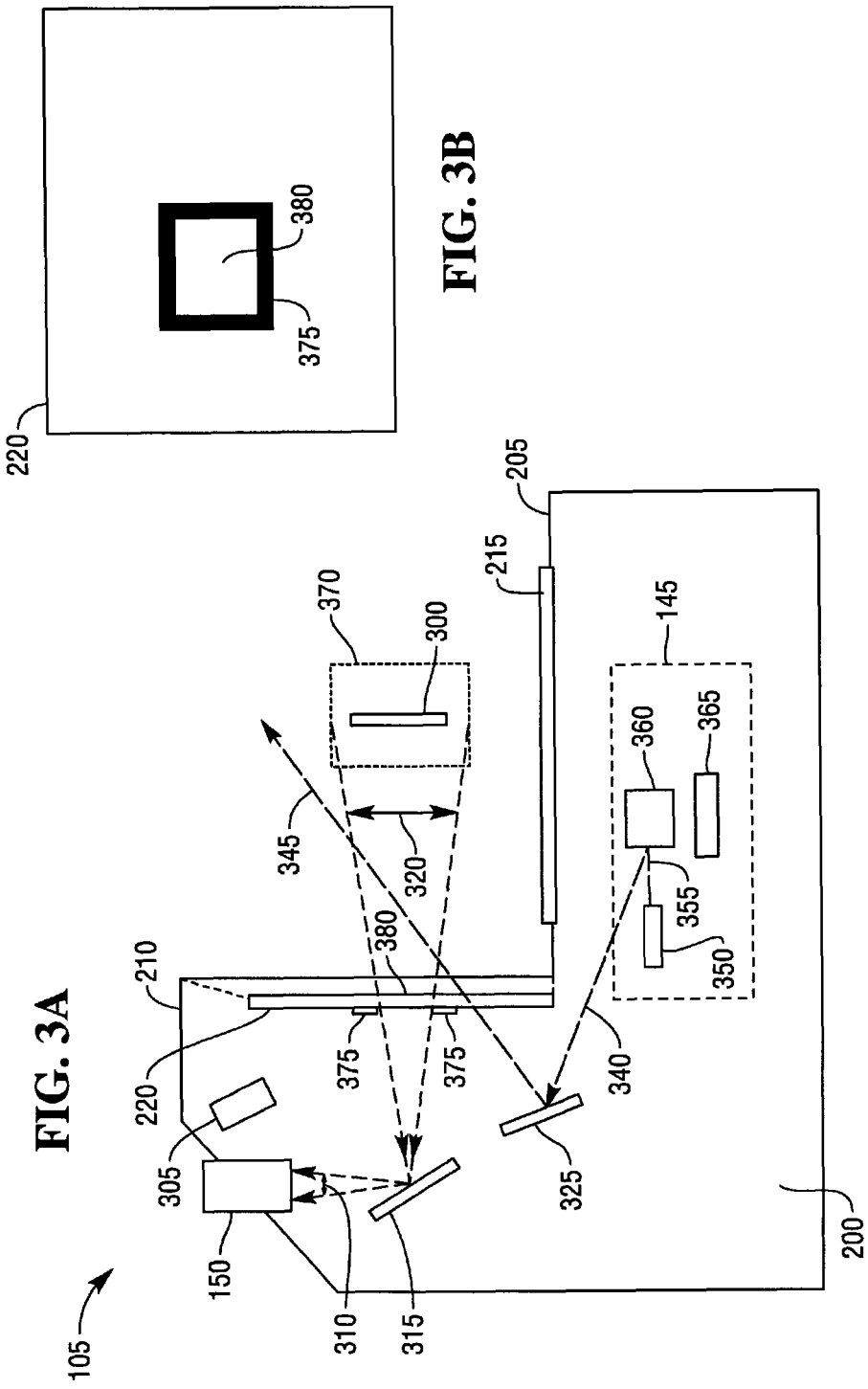

HYBRID OPTICAL CODE SCANNER AND SYSTEM

FIELD OF THE INVENTION

The present invention relates generally to a hybrid optical code scanner. More particularly, but not exclusively, the invention relates to a scanner and system for identifying an optimal presentation location for an optical code.

BACKGROUND

Any discussion of prior art throughout the specification should in no way be considered as an admission that such prior art is widely known or forms part of common general knowledge in the field.

A hybrid optical code scanner includes a laser scanner and an imaging scanner. The two scanners are used to independently read optical codes such barcodes presented to the scanner. The laser scanner reads a barcode by sweeping a laser beam across the barcode, capturing data representing the reflected laser light, and then processing the captured data. An imaging scanner reads a barcode by capturing a complete image of the barcode and then processing the image.

When a barcode is presented to the imaging scanner, the barcode generally faces away from the operator and toward the imaging scanner. Even if the imaging scanner projects targeting marker beams that identify where to place the barcode (the sweet spot), the barcode or the item the barcode is attached to will block the operator's view of the beams. This makes the image scanning process essentially a blind operation.

To complicate the process, the size of the preferred imaging location (sweet spot) can be small and its exact location is not intuitive to the operator. The combination of not knowing where to present a barcode and not being able to see targeting the marker beams, significantly reduces scan performance and reduces the shopping experience for the operator. The operator is typically a customer but could be an employee.

Therefore, there is a need for a hybrid optical code scanner that provides an effective way to properly align optical codes with an imaging scanner of the hybrid optical code scanner.

SUMMARY OF THE INVENTION

It is an object of the present invention to overcome or ameliorate at least one of the disadvantages of the prior art, or to provide a useful alternative.

Among its several aspects, one embodiment of the present invention recognizes a condition where an operator or user of a hybrid optical code scanner ("hybrid scanner") has difficultly determining the optimal location for presenting an optical code to the hybrid scanner for imaging by an imaging scanner in the hybrid scanner. One aspect of the present invention provides a visual indicator to the operator that identifies the optimal location for presenting the optical code for scanning by the imaging scanner.

The visual indicator is visible when the imaging scanner is in operation and is invisible when the imaging scanner is not operating.

In accordance with an embodiment of the present invention, there is provided a hybrid optical code scanner comprising: a vertical scanning window; a laser scanner for reading optical codes where the laser scanner generates at least one laser scan beam that passes through the vertical scanning window; an imaging scanner for reading optical codes where the imaging scanner captures a image of an optical code that is positioned in a predetermined area in front of the vertical scanning window and where the space between the imaging scanner and the predetermined area forms a first image path; an ultra-violet light source; and an optically transparent or translucent material applied as a thin band to the inside surface of the vertical scanning window where the material fluoresces when exposed to ultra-violet light from the ultra-violet light source and where the thin band encompasses an area of the vertical scanning window that includes the portion of the first image path that passes through the vertical scanning window.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

FIG. 3A is a high-level cross-sectional drawing further illustrating the exemplar embodiment of the hybrid optical code scanner.

FIG. 3B is a high-level drawing further illustrating the vertical scanning window of the hybrid optical code scanner.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The term optical code includes both one and two dimensional barcodes as well as documents such as a driver's license or other forms of identification.

Figure 1:
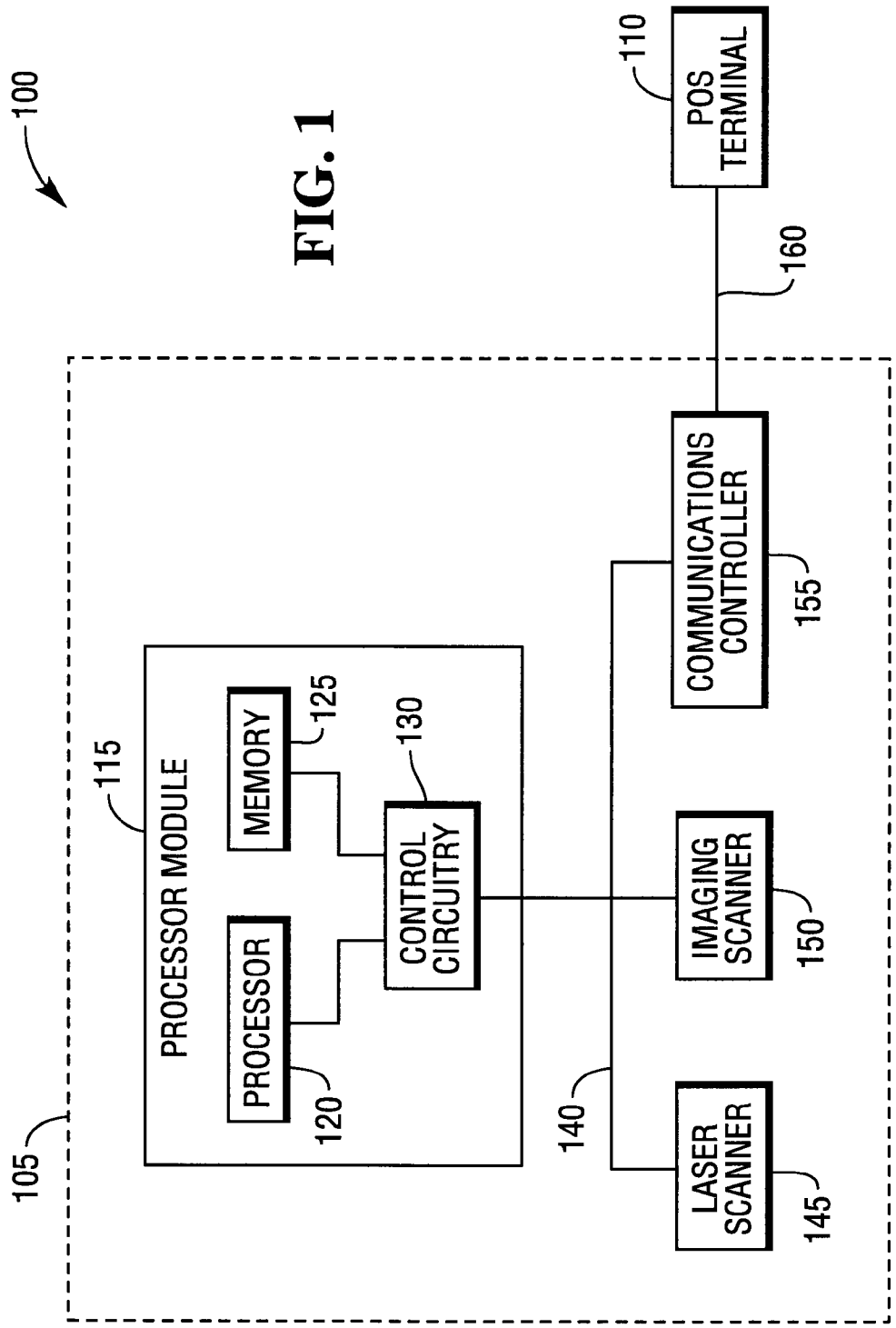
FIG. 1 is a high-level block diagram illustrating an exemplar embodiment of a point-of-sale system.

Referring now to FIG. 1, there is provided a high-level block diagram illustrating an exemplar embodiment of a point of sale (POS) system 100. The system 100 includes a hybrid optical code scanner ("hybrid scanner") 105 and a POS terminal 110 where both are connected by a computer network 160. The hybrid optical code scanner 105 includes a processor module 115, a laser scanner 145, an imaging scanner 150 and a communications controller 155.

Within the processor module 115, there is included a processor 120, a memory 125 and control circuitry 130. The memory 125 includes both volatile and non-volatile memory. Software stored in the memory 125 is executed by the processor 120 which causes the processor 125 to control the devices and operation of the hybrid optical code scanner 105. The control circuitry 130 provides an interface between the processor 120 and the memory 125 and between the processor 120 a bus 140 used to communicate with other devices that comprise the hybrid optical code scanner 105 including but limited to the laser scanner 145, imaging scanner 150 and communications controller 155.

The laser scanner 145 includes a laser generation device (FIG. 3A, 350), a laser beam directing device (FIG. 3A, 360)

for directing a laser beam (FIG. 3A, 355) generated by the laser generation device (FIG. 3A, 350) and a photo-detector (FIG. 3A, 365) for detecting laser light reflected from an optical code back to the laser scanner 145. The laser scanner 145 also includes a pattern mirror (FIG. 3A, 325) used to direct a laser beam (FIG. 3A, 340) reflected by the laser beam directing device (FIG. 3A, 360).

The imaging scanner 150 includes an image capture device such as a CMOS image sensor. When an optical code is presented to the hybrid optical code scanner 105, the imaging scanner 150 captures an image of the optical code and processes the image to recover data encoded in the optical code.

The communications controller 155 includes hardware and software required to communicate with external devices over the computer network 160. In some embodiments, the computer network 160 is implemented using an industry standard USB bus that connects the hybrid optical code scanner 105 to the POS terminal 110.

Figure 2:
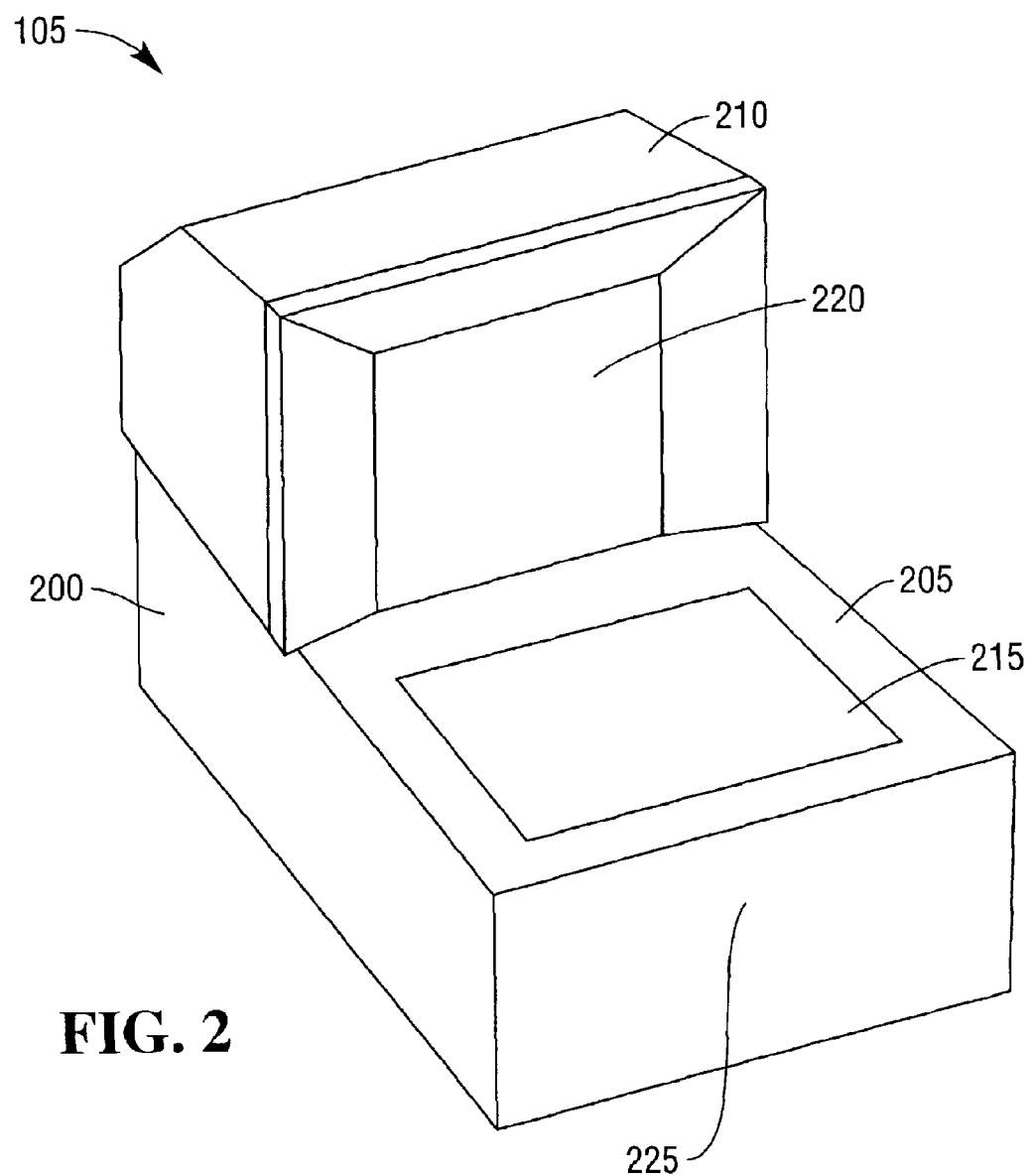
FIG. 2 is a high-level drawing illustrating an exemplar embodiment of a hybrid optical code scanner.

Turning to FIG. 2, there is provided a high-level drawing illustrating an exemplar embodiment of the hybrid optical code scanner 105. The hybrid optical code scanner 105 includes a housing 200 comprising a vertical housing component 210 and horizontal housing component 205. The vertical housing component 210 includes vertical scanning window 220 and the horizontal housing component 205 includes a horizontal scanning window 215. The vertical scanning window 220 faces the front 225 of the hybrid optical code scanner 105. An operator/user of the hybrid optical code scanner 105 stands in front 225 of the hybrid optical code scanner 105 facing the vertical scanning window 220 and moves optical codes (FIG. 3A, 300) for scanning through a first volume of space (FIG. 3A, 370) generally above the horizontal scanning window 215 and in front of the vertical scanning window 220.

The imaging scanner 150 is shown as part of the vertical housing component 210. In some embodiments, the imaging scanner 150 is removable from the vertical housing component 210 and is operated as a hand held device to read optical codes. However, when the imaging scanner 150 is docked in the vertical housing component 210 it reads optical codes as depicted in this figure. In other embodiments, the imaging scanner 150 is positioned in different locations within the hybrid scanner 105 and maybe fixed or removable.

The laser and imaging scanners each have an optimal area in space where an optical code located in this area has the highest probability of the being read by the scanner. The size and location of the optimal area is different for the laser and imaging scanner. Therefore, the area that works best for the imaging scanner, maybe work as well for the laser scanner and vise-versa. The imaging scanner's optimal area is the first volume of space 370, also known as the sweet spot.

With reference to FIG. 3A, there is provided a high-level cross-sectional drawing further illustrating the exemplar embodiment of the hybrid optical code scanner 105. The pattern mirror 325 is one of a plurality of pattern mirrors (not shown). The pattern mirror 325 receives the laser beam 340 from a laser beam directing device 360 and reflects the laser beam 345 through the vertical scanning window 220 to an area in front of the vertical scanning window 220 and generally over the horizontal scanning window 215. In some embodiments, the area the laser beam 345 is directed to may extend past the perimeter of the horizontal scanning window 215. The laser beam directing device 360 causes the laser beam 345 to move so that it scans a second volume of space. If the laser beam 345 strikes and moves across an optical code, the reflected laser light is directed (directing devices not shown) back to the laser scanner 145 where the laser light is detected to the photo-detector 365 and data encoded in the optical code read. Laser scanners, in general, are best suited to read one dimensional (1D) barcodes (which are included as an optical code).

The optical code 300, which in this embodiment is a two dimensional (2D) barcode, is presented to the hybrid optical code scanner 150 to be read by the imaging scanner 150. A first image of the optical code 300 travels along a first path 320 through the vertical scanning window 220 to a mirror 315 where it is reflected along a second path 310 to the imaging scanner 150 and is captured for processing. The first path 320 is not a thin line like a laser beam but is a wider path that allows the imaging scanner 150 to capture a complete image of the optical code 300.

The optical code 300 is positioned over the horizontal scanning window 215 and in front of the vertical scanning window 220 in the imaging scanner's 150 sweet spot 370. When an optical code is in the sweet spot 370, it will fall within the field of vision and depth of field for the imaging scanner 150. This means that the optical code will be visible and in focus when it is located in the sweet spot 370 and facing the vertical scanning window 220.

However, finding the sweet spot 370 maybe difficult. To aid the user in finding the sweet spot 370, an optically transparent material 375, such as an ultra-violet (UV) ink, is applied to the inside surface of the vertical scanning window 220. The material 375 is applied around a first area 380 that is defined as the area of the vertical scanning window 220 where the first path 320 passes through. The generally geometry of the area 380 is a square or rectangle (this is not a requirement) and the material 375 is applied round the perimeter of the area 380. In some embodiments, the area 380 is simply a dot that identifies the center of the sweet spot 370 and the material 375 is applied over the dot. An ultra-violet light source 305 is included in the housing 200 and is in a location that allows it to illuminate the material 375 with UV light. When the imaging scanner 150 is operating, the light source 305 is turned on and ultra-violet light from the light source 305 strikes the material 375 causing it to fluoresce, making the material 375 visible to the user of the hybrid optical code scanner 105. In some embodiments, the ultra-violet light is reflected off of one or more mirrors between the light source 305 and the material 375. The now visible material 375 provides an visual indication to the user of location of the sweet spot 370. The sweet spot 370 for the imaging scanner 150 will be in front of the material 370 at about the same height above the horizontal scanning window 215.

The material 375 is applied as a thin layer or band around the perimeter of the area 380. The width of the material 375 can vary but is wide enough so that the material 375 is easily visible to the user when it fluoresces. The material 370 is optically transparent when applied in a thin layer. In some embodiments, the material 375 is optically translucent when applied in a thin layer.

Since UV light can be harmful to humans, the vertical scanning window 220 and the horizontal scanning window 215 are made out of a transparent material, such as polycarbonate, that has the intrinsic property of filtering out most or all UV light. By filtering out the UV light, the operator of the hybrid scanner 105 is protected. In some embodiments, the window is constructed from multiple sheets of glass with polycarbonate film placed in between the glass sheets.

FIG. 3B further illustrates the material 375 on the vertical scanning window 220. In this example, the sweet spot 370 is located slightly to the left of the center of the vertical scanning window 220. As a result, the material 375 is offset to left of center.

In this embodiment, the material 375 is applied in a continuous band around the area 380. In other embodiments, the material 375 is applied in other patterns such as just in the corners to form corner hash marks. Many patterns are possible as long as they indicate to the user the location of the sweet spot 370 for the imaging scanner 150.

Although particular reference has been made to an embodiment that includes a hybrid optical code scanner and examples have been provided illustrating the invention in combination with a laser and imaging scanner, certain other embodiments, variations and modifications are also envisioned within the spirit and scope of the following claims. For example, there are embodiments where the invention is used in scanners having only an imaging scanner.

I claim:

1. A hybrid optical code scanner comprising:
    a vertical scanning window;
    a laser scanner for reading optical codes where the laser scanner generates at least one laser scan beam that passes through the vertical scanning window;
    an imaging scanner for reading optical codes where the imaging scanner captures a image of an optical code that is positioned in a predetermined area in front of the vertical scanning window and where the space between the imaging scanner and the predetermined area forms a first image path;
    an ultra-violet light source; and
    an optically translucent material applied as a thin band to the inside surface of the vertical scanning window where the material fluoresces when exposed to ultra-violet light from the ultra-violet light source and where the thin band encompasses an area of the vertical scanning window that includes the portion of the first image path that passes through the vertical scanning window and where the ultra-violet light source is turned on when the imaging scanner is operating causing the optically translucent material to fluoresce creating a visual indicator indicating the location of the predetermined area.

2. The hybrid optical code scanner of claim 1, where the imaging scanner is normally docked to but is also removable from the hybrid optical code scanner and is operable to read optical codes in either the docked or removed position.

3. The hybrid optical code scanner of claim 1, where the optically translucent material fluoresces a visible light.

4. The hybrid optical code scanner of claim 3, where the visible light is generally red in color.

5. The hybrid optical code scanner of claim 1, where the optical code is a barcode.

6. The hybrid optical code scanner of claim 1, where the optical code is an identification document.

7. The hybrid optical code scanner of claim 1, where the vertical scanning window is made of a transparent material that intrinsically filters out ultra-violet light.

8. A point-of-sale system including:
    a point-of-sale terminal;
    a computer network; and
    a hybrid optical code scanner connected to the point-of-sale terminal over the computer network, the hybrid optical code scanner comprising:
        a vertical scanning window;
        a laser scanner for reading optical codes where the laser scanner generates at least one laser scan beam that passes through the vertical scanning window;
        an imaging scanner for reading optical codes where the imaging scanner captures a image of an optical code that is positioned in a predetermined area in front of the vertical scanning window and where the space between the imaging scanner and the predetermined area forms a first image path;
        an ultra-violet light source; and
        an optically translucent material applied as a thin band to the inside surface of the vertical scanning window where the material fluoresces when exposed to ultra-violet light from the ultra-violet light source and where the thin band encompasses an area of the vertical scanning window that includes the portion of the first image path that passes through the vertical scanning window and where the ultra-violet light source is turned on when the imaging scanner is operating causing the optically translucent material to fluoresce creating a visual indicator indicating the location of the predetermined area.

9. The system of claim 8, where the imaging scanner is normally docked to but is also removable from the hybrid optical code scanner and is operable to read optical codes in either the docked or removed position.

10. The system of claim 8, where the optically translucent material fluoresces a visible light.

11. The system of claim 10, where the visible translucent is generally red in color.

12. The system of claim 8, where the optical code is a barcode.

13. The system of claim 8, where the optical code is an identification document.

14. The system of claim 8, where the vertical scanning window is made of a transparent material that intrinsically filters out ultra-violet light.

\* \* \* \* \*